US010382166B1

(12) United States Patent
Ashe et al.

(10) Patent No.: US 10,382,166 B1
(45) Date of Patent: Aug. 13, 2019

(54) CONSTRAINED RECEIVER PARAMETER OPTIMIZATION

(71) Applicant: Seagate Technology LLC, Cupertino, CA (US)

(72) Inventors: Vincent Brendan Ashe, San Jose, CA (US); Jason Vincent Bellorado, San Jose, CA (US); Marcus Marrow, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/439,450

(22) Filed: Feb. 22, 2017

(51) Int. Cl.

| | |
|---|---|
| ***H04L 27/06*** | (2006.01) |
| ***H04B 1/16*** | (2006.01) |
| ***H04L 1/00*** | (2006.01) |
| ***H04L 25/02*** | (2006.01) |

(52) U.S. Cl.
CPC ............ *H04L 1/0054* (2013.01); *H04B 1/16* (2013.01); *H04L 25/025* (2013.01)

(58) Field of Classification Search
CPC .......... H03M 13/4146; H03M 13/4153; H04L 1/0054; H04L 25/025; G06F 17/17; G06F 17/11
See application file for complete search history.

(56) References Cited

U.S. PATENT DOCUMENTS 5,563,746 A 10/1996 Bliss
5,726,818 A 3/1998 Reed et al.
5,754,352 A 5/1998 Behrens et al.
5,793,548 A 8/1998 Zook
5,822,142 A 10/1998 Hicken
5,909,332 A 6/1999 Spurbeck et al.
5,954,837 A 9/1999 Kim
6,069,758 A 5/2000 Chung
6,172,836 B1 1/2001 Bang
6,275,346 B1 8/2001 Kim et al.
6,307,696 B1 10/2001 Bishop et al.
6,330,293 B1 12/2001 Klank et al.
6,353,649 B1 3/2002 Bockleman et al.
6,480,349 B1 11/2002 Kim et al.
6,594,094 B2 7/2003 Rae
6,594,098 B1 7/2003 Sutardja
6,760,185 B1 7/2004 Roth et al.
6,973,150 B1 12/2005 Thuringer
6,996,193 B2 2/2006 Yamagata et al.
7,035,029 B2 4/2006 Sawada et al.
7,068,461 B1 6/2006 Chue et al.
(Continued)

*Primary Examiner* — Aristocratis Fotakis
(74) *Attorney, Agent, or Firm* — Cesari & Reed LLP; Kirk A. Cesari

(57) ABSTRACT

Systems and methods are disclosed for constrained receiver parameter optimization. Two parameter optimization functions may be applied, with one function providing constraints on the results of the second function in order to determine a parameter set to apply in the receiver. A method may comprise determining a first parameter set based on a first function, determining a second parameter set based on a second function different from the first function, and determining a third parameter set by using the first parameter set to define a subset of a parameter space to which to limit values from the second parameter set. In certain embodiments, a least squares function may be used to constrain the results of a general cost function.

20 Claims, 5 Drawing Sheets

(56) References Cited

U.S. PATENT DOCUMENTS

| | | | |
|---|---|---|---|
| 7,075,967 | B2 | 7/2006 | Struhsaker et al. |
| 7,199,956 | B1 | 4/2007 | Moser et al. |
| 7,297,582 | B2 | 11/2007 | Asakura et al. |
| 7,602,568 | B1 | 10/2009 | Katchmart |
| 7,643,548 | B2 | 1/2010 | Hafeez |
| 7,665,007 | B2 | 2/2010 | Yang et al. |
| 7,738,538 | B1 | 6/2010 | Tung |
| 7,917,563 | B1 | 3/2011 | Shih et al. |
| 7,995,691 | B2 | 8/2011 | Yang |
| 8,019,026 | B2 | 9/2011 | Maltsev et al. |
| 8,077,571 | B1 | 12/2011 | Xia et al. |
| 8,121,229 | B2 | 2/2012 | Kuo et al. |
| 8,139,305 | B2 | 3/2012 | Mathew et al. |
| 8,159,768 | B1 | 4/2012 | Miyamura |
| 8,266,505 | B2 | 9/2012 | Liu et al. |
| 8,331,050 | B1 | 12/2012 | Zou |
| 8,400,726 | B1 | 3/2013 | Zheng |
| 8,405,924 | B2 | 3/2013 | Annampedu |
| 8,516,347 | B1 | 8/2013 | Li et al. |
| 8,553,730 | B2 | 10/2013 | Schmidl et al. |
| 8,560,900 | B1 * | 10/2013 | Bellorado ........ G11B 20/10268 703/25 |
| 8,593,750 | B2 | 11/2013 | Shibano |
| 8,625,216 | B2 | 1/2014 | Zhang et al. |
| 8,681,444 | B2 | 3/2014 | Zhang |
| 8,706,051 | B2 | 4/2014 | Park et al. |
| 8,774,318 | B2 | 7/2014 | Lakkis |
| 9,043,688 | B1 * | 5/2015 | Chan ................ G11B 20/10009 714/795 |
| 9,078,204 | B2 | 7/2015 | Okazaki |
| 9,129,646 | B2 | 9/2015 | Mathew et al. |
| 9,236,952 | B2 | 1/2016 | Sun |
| 9,362,933 | B1 * | 6/2016 | Chaichanavong ...... H03M 1/08 |
| 9,537,589 | B2 | 1/2017 | Kim et al. |
| 9,613,652 | B2 | 4/2017 | Link et al. |
| 10,152,457 | B1 * | 12/2018 | Bellorado .............. H03H 17/00 |
| 2002/0094048 | A1 | 7/2002 | Simmons et al. |
| 2003/0026016 | A1 | 2/2003 | Heydari et al. |
| 2003/0048562 | A1 | 3/2003 | Heydari et al. |
| 2003/0185291 | A1 * | 10/2003 | Nakahira .......... H04L 25/03038 375/229 |
| 2004/0047403 | A1 | 3/2004 | Choi et al. |
| 2007/0002890 | A1 | 1/2007 | Mangold et al. |
| 2007/0018733 | A1 | 1/2007 | Wang |
| 2008/0292029 | A1 | 11/2008 | Koslov |
| 2009/0074113 | A1 * | 3/2009 | Sung ..................... H04L 1/0036 375/341 |
| 2009/0110048 | A1 * | 4/2009 | Luschi ................ H04L 25/0212 375/232 |
| 2009/0110120 | A1 * | 4/2009 | McNamara ....... H04L 25/03292 375/340 |
| 2009/0113429 | A1 * | 4/2009 | Luschi ................. H04B 1/0003 718/100 |
| 2009/0268857 | A1 | 10/2009 | Chen |
| 2010/0138722 | A1 | 6/2010 | Harley |
| 2010/0211830 | A1 | 8/2010 | Sankaranarayanan et al. |
| 2010/0272150 | A1 | 10/2010 | Kil et al. |
| 2011/0072330 | A1 | 3/2011 | Kolze |
| 2011/0158359 | A1 | 6/2011 | Khayrallah et al. |
| 2013/0182347 | A1 * | 7/2013 | Maeto .................... G11B 20/10 360/39 |
| 2013/0339827 | A1 * | 12/2013 | Han ................. G11B 20/10046 714/799 |
| 2014/0337676 | A1 | 11/2014 | Yen et al. |
| 2014/0355147 | A1 | 12/2014 | Cideciyan et al. |
| 2015/0124912 | A1 * | 5/2015 | Eliaz ................. H04L 25/03305 375/341 |
| 2015/0179213 | A1 | 6/2015 | Liao et al. |
| 2015/0189574 | A1 | 7/2015 | Ng et al. |
| 2016/0055882 | A1 | 2/2016 | Cideciyan et al. |
| 2016/0134449 | A1 | 5/2016 | Liu et al. |
| 2016/0156493 | A1 | 6/2016 | Bae et al. |
| 2016/0270058 | A1 | 9/2016 | Furuskog et al. |
| 2016/0293205 | A1 * | 10/2016 | Jury ................. G11B 20/10046 |
| 2017/0162224 | A1 | 6/2017 | Mathew et al. |

* cited by examiner

CONSTRAINED RECEIVER PARAMETER OPTIMIZATION

SUMMARY

In certain embodiments, a circuit may comprise a digital data channel including a pre-processor module configured to sample a signal to generate sample values, a detector module configured to determine bit values based on the sample values, a least squares function module configured to determine a first parameter set for the digital data channel based on the sample values and a least squares algorithm, and a general cost function module configured to determine a second parameter set for the digital data channel based on a general cost algorithm. The digital data channel may also include a limiter module configured to generate a third parameter set based on constraining the second parameter set with the first parameter set, and modify applied parameters of the digital data channel based on the third parameter set.

In certain embodiments, an apparatus may comprise a circuit configured to select receiver parameters. The circuit may determine a first parameter set based on a least squares function, limit results of a general cost function based on the first parameter set to determine a second parameter set, and perform signal processing at the receiver using the second parameter set.

In certain embodiments, a method may comprise performing a parameter optimization procedure for a receiver, including determining a first parameter set based on a first function, determining a second parameter set based on a second function different from the first function, determining a third parameter set by using the first parameter set to define a subset of a parameter space to which to limit values from the second parameter set, and performing signal processing in the receiver using the third parameter set.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
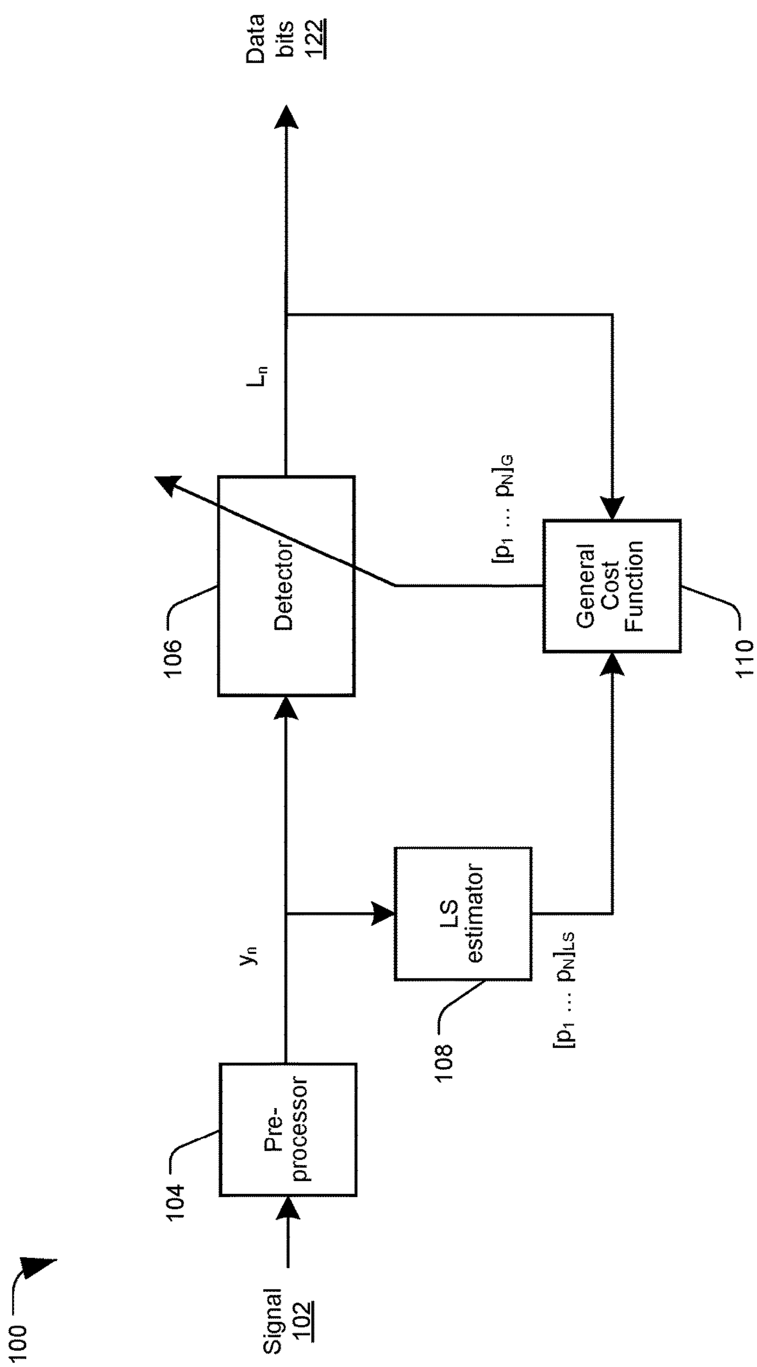
FIG. 1 is a method flow diagram of a system configured to perform constrained receiver parameter optimization, in accordance with certain embodiments of the present disclosure.

FIG. 1 depicts a method flow diagram of a system 100 configured to perform constrained receiver parameter optimization, in accordance with certain embodiments of the present disclosure. The system 100 may include a receiver which can be used to receive and process a data stream. For example, a receiver may be part of a communications channel by which an information signal 102 is received and processed to obtain data, such as a sequence of data bits 122. For example the receiver could be one or more circuits in a wireless device, a cable modem, or in a hard disk drive read channel. A receiver may be employed at a receiving end of wired or wireless transmissions, or in devices such as storage drives for storing data to and retrieving data from a storage medium. The components of the receiver may include circuitry, registers, and modules configured to perform operations in relation to the signal 102, and may be included on one or more chips of a device. Although examples and illustrative embodiments provided herein may be directed to implementations within a data storage device (DSD), the applicability of the techniques are not limited thereto.

System 100 may include a pre-processor 104 configured to perform initial processing on the signal 102 in order to convert the signal 102 into a form from which individual bit values may be detected. The pre-processor 104 may include an interface configured to receive the signal 102, an analog front end (AFE) configured to condition an analog signal via amplifiers, filters, and other operations, an analog to digital converter (ADC) configured to periodically sample the conditioned analog signal, and an equalizer configured to reverse or reduce distortions in the signal 102. The equalized signal samples $y_n$ may be provided to a detector 106, a subcomponent of a receiver which may determine a sequence of data bits 122 provided by the signal 102 based on the sampled values from the ADC (e.g. whether the sample values indicate a 1 or a 0).

In many signal processing applications, an optimization procedure may be used to determine a set of receiver parameters to minimize a specific cost function. For example, parameters used by the detector 106 may be selected to minimize a bit error rate (BER) of the detected bit sequence. Parameters may include weight and variable values applied by the channel components when executing functions and calculating results, other values, or any combination thereof. For example, the detector 106 may include a partial response maximum likelihood (PRML) detector configured to implement a SOVA (soft output Viterbi algorithm). For a PRML detector in a read channel, the parameters can include the branch biases used in the Viterbi detector. If the Viterbi included data dependent noise prediction, the parameters can additionally include the data dependent noise whitener coefficients and variances. Additionally, once an initial solution to the optimization procedure has been found, it may be advantageous to continue running the optimization procedure to track channel variations.

Modules within the system 100 may produce parameter sets that may be provided to receiver components, such as the detector 106, to influence those components' behavior. Functions may determine parameters to minimize or maximize a selected value. For a HDD, the general cost function goal could be BER. The system 100 may determine a set of detector parameters which minimizes BER at the detector 106 output.

Various approaches or equations may be used in the optimization procedure to generate or estimate the optimal receiver parameters. For example, a least squares (LS) cost function may be used because its convergence is generally well behaved, it is less prone to dynamic range issues (since it minimizes error magnitude), and low complexity implementations are available, such as the least mean squares (LMS) algorithm. For example, a PRML Viterbi detector may produce a "soft" output indicating both bit value estimates and the reliability of the estimates. The estimate reliability value $L_n$ may be expressed as a log likelihood ratio (LLR). In an example embodiment, the sign (e.g. '+' or '−') may indicate the bit value (e.g. 1 or 0), while the magnitude of $L_n$ may indicate a reliability of the bit estimate. A Viterbi detector 106 may use the expected means of a set of equalized samples corresponding to different data patterns to make bit value estimates. For an additive white Gaussian noise (AWGN) and intersymbol interference (ISI) channel the means of the equalized samples corresponding to different data patterns may correspond to least squares error. For an HDD the channel noise may be nonlinear or data-dependent, so the equalized samples may minimize the least squares error. However, in many applications minimizing least squares cost may provide a satisfactory result, but may not minimize the system performance figure-of-merit (e.g. BER). Additionally the channel may be subject to nonlinear perturbations such as nonlinear distortion and data dependent noise. So while LS functions may produce workable results, they may still produce sub-optimal results.

To explain another way, LS is a convex cost function. The LS function may have a unique global minimum (e.g. the bottom of the "bowl"), such that a determined minimum value will be the global minimum. There may not be issues with arriving at local minima. The LS cost function may be a continuous function and hence varies smoothly with respect to applied parameters. BER, on the other hand, may be a nonlinear function of the detector parameters. A BER function may have multiple local minima, and saddle points which can be problematic during optimization.

Therefore it may be desirable to perform optimization with respect to a general cost function, such as for BER. As used herein, the term "general cost function" may be used to mean any cost function other than the mean squared or least squares error cost functions. Some examples of general cost functions could be: BER, sector failure rate, LLR distribution or shape, or a weighted combination of quality metrics. As the general cost function is not least squares, the system can become more prone to saturation issues. Additionally this cost function may not be a globally well behaved function of the receiver parameters. There may exist multiple solutions which locally minimize the cost function, but which are impractical to implement due to parameter dynamic range limitations. For example, a cost function may produce a result that is optimal but that is outside a realistic parameter range for the system 100. To phrase it another way, a least squares algorithm may produce a single "minimum" value (e.g. set of parameters) that may not be optimal for the selected performance metric. On the other hand, a general cost function may produce multiple local solutions or minimums, with some solutions resulting in huge parameter values being chosen for the detector 106 that are greatly outside the practical range for fixed-point implementation.

Accordingly, a method is presented for constraining an optimization procedure driven with respect to a general cost function to search in a subset of the parameter space which includes parameters that are feasible to implement. The presented method may also be adaptive in order to track channel variations.

A first well-behaved algorithm may be used to define or establish a parameter "range" within which a second algorithm may select the receiver parameter set. For example, a least squares (LS) procedure may be used to estimate a set of optimal parameters with respect to a LS cost function. This set of LS parameters may be used to center and limit the parameter space searched during a parallel optimization procedure with respect to a general cost function. The result may be a parameter solution that is more reliable than that produced by the LS algorithm, and which is within an acceptable parameter range.

Given a parameter set $[p_1 \ldots p_n]$ the cost function or value $C(p_1, \ldots, p_n)$ may be a measure of how well that parameter set performs. For a given cost function, an optimization procedure may be applied to seek the parameter set with lowest cost. For the least squares approach, the cost function may be the mean square error. The least squares solution can minimize the mean squared error. This LS cost function may generally be a convex function of the parameter set, and hence amenable to simple mathematical formulation and analysis. However, in a communication system it may be advantageous to find a parameter set which minimizes bit error rate (or some other parameter). For non-ideal channels (e.g. nonlinear or data-dependent), least squares optimization may find an acceptable solution, but parameter sets in the vicinity of the least squares solution may result in even lower BER. A general cost function may be used to identify the parameter sets within the vicinity of the least squares solution that produce superior BER values.

In regard to system 100, the equalized sample values $y_n$ from the pre-processor may be provided to a least squares (LS) algorithm or estimator 108 (e.g. using LMS), which may produce a least squares solution parameter set $[\mathbf{p1} \ldots p_N]_{LS}$. The detector output $L_n$ (e.g. SOVA detector LLRs) and the LS parameter set may be applied to a general cost function 110, which may produce a general cost function parameter set $[\mathbf{p1} \ldots p_N]_G$. The results of the general cost function 110 may be limited or constrained by the LS parameter set, producing parameters that may be better optimized than the LS parameters while constrained within an acceptable parameter range. For example, constrained parameter value ranges may be centered on or otherwise limited by the LS parameter values, and the results of the general cost function 110 may be limited to falling within the constrained ranges. The results of the general cost function 110 may be constrained in a number of ways. For example, the LS parameter set may be used as an input to the general cost function 110 so that the general cost function 110 only searches for parameter values within a range based on the LS parameter set. The general cost function 110 may try all solutions within a range defined by the LS parameter set, and select the one that minimizes the general cost function. In another example, the general cost function 110 may generate parameter values based on the detector output $L_n$ alone, and those general cost parameter values may then be reduced or modified based on the LS parameter values (e.g. the general cost solution based on Ln could be limited to fall within a range defined by the LS parameter values, if necessary). Once selected, the general cost parameter set may be applied to the detector 106 to adaptively adjust the detector parameters in response to changing signal and channel conditions. Parameter values may be selected for other components instead of or in addition to the detector 106, such as for the pre-processor 104 or components thereof. The proposed parameter optimization procedure is discussed in greater detail in regard to FIG. 2.

Figure 2:
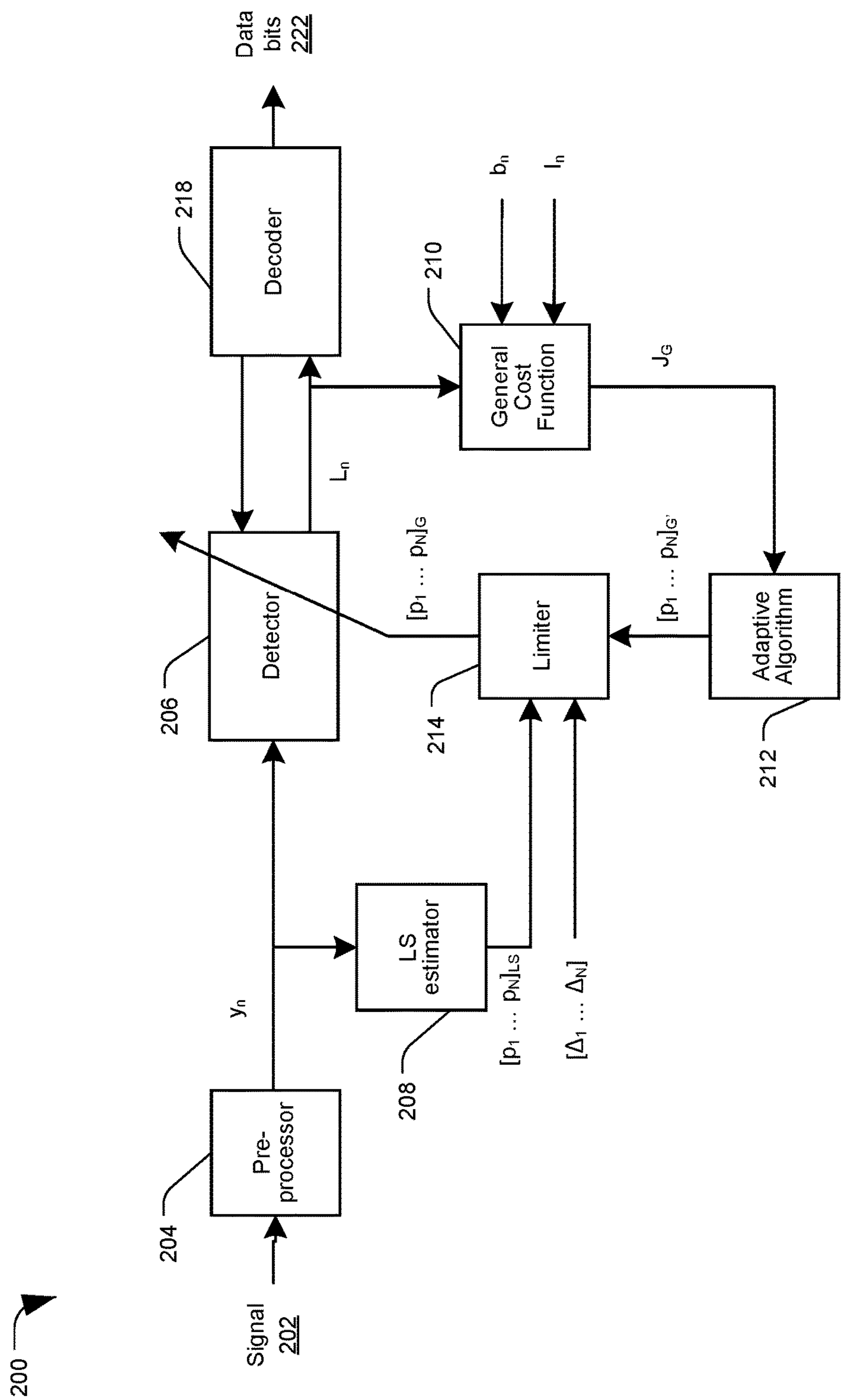
FIG. 2 is a method flow diagram of a system configured to perform constrained receiver parameter optimization, in accordance with certain embodiments of the present disclosure.

FIG. 2 depicts a method flow diagram of a system 200 configured to perform constrained receiver parameter optimization, in accordance with certain embodiments of the present disclosure. System 200 may correspond to system 100 of FIG. 1, including elements such as the signal 202, pre-processor 204, detector 206, decoder 218, data bits 222, least squares (LS) module 208, and general cost function 210. The decoder 218 may receive bit value and reliability estimates Ln from the detector 206. The decoder may iteratively attempt to decode codewords and provide reliability feedback to the detector 206, or generate a sequence of decoded data bits 222. Additionally, system 200 may include an adaptive algorithm 212, configured to generate a general cost parameter set $[p_1 \ldots p_N]_{G'}$ based on the results $J_G$ from the general cost function 210, and a limiter 214 configured to generate a final or constrained parameter set $[p_1 \ldots p_N]_G$ by limiting the general cost parameter set based on the LS parameter set. FIG. 2 provides another possible implementation of a system configured to perform constrained receiver optimization as shown in FIG. 1. In FIG. 2 the constraint may be performed via the limiter 214, which for example may limit the optimization space to a hyper-rectangle centered on a LS estimate.

In an example system 200 having a PRML detector 206, the pre-processor 204 may include timing or gain stages along with magneto-resistive asymmetry (MRA) and offset cancellation, with equalization to a desired target response. The general cost function 210 can be a function of the expected data bits $b_n$, the SOVA LLRs $L_n$, and auxiliary information $I_n$, such as system quality indicators. Examples of auxiliary information may include quality or performance metrics from the channel, such as an average iteration count required to decode a codeword from a low density parity check (LDPC) decoder 218, which can be used as a quality measure or cost which the general cost function 210 seeks to reduce. When the general cost function 210 is BER, the estimated bit values from $L_n$ may be compared against the expected bit values $b_n$. A more sophisticated general cost function might be able to additionally exploit the reliability information $I_n$ to improve system performance or reliability. For example, the general cost function 210 may be used to optimize the receiver parameters such that the LLR distribution achieves a certain shape, dynamic range, or both.

The results $J_G$ of the general cost function 210 may be provided to the adaptive algorithm 212, which may use the results to generate the general cost function parameter set $[p_1 \ldots p_N]_{G'}$. The adaptive algorithm 212 may be an algorithm that changes its behavior based on information available at the time it is run. This information may include the general cost function results, information provided to the general cost function 210, or other available information about the channel or signal. For example, the adaptive algorithm 212 could be a brute force search for optimal parameter values, or a directed search driven by measurements of the cost function $J_G(L_n, b_n, I_n)$. The general cost function 210 and adaptive algorithm 212 can operate in either a training mode, where a known bit pattern is read so that $b_n$ is known beforehand, or in a decoder directed mode, where unknown bits are determined via error correction code (ECC)-decoding and used as the expected $b_n$. The estimated bit sequence from the detector 206 may be passed to a decoder 218 which performs ECC decoding to correct erroneous bit estimates and determine final bit values 222, which may in turn be provided as the values for $b_n$.

A least squares based estimator 208 (such as using LMS) may be used to estimate an optimal set of detector parameters $[p_1 \ldots p_N]_{LS}$ with respect to a least squares cost function and sample values $y_n$.

The general cost parameter set and the LS parameter set may be provided to the limiter 214. The limiter may limit or modify the general cost parameter set based on the LS parameter set and a set of parameter constraint range values $[\Delta_1 \ldots \Delta_N]$. The parameter constraint range values may define a numeric range around values of the LS parameter set within which the values of the final applied constrained parameter set must fall. In particular, given a least squares estimate $[p_1 \ldots p_N]_{LS}$, the limiter 214 may limit the generalized cost parameter set to the range $[p_1 \ldots p_N]_{LS}$, $\pm[\Delta_1 \ldots \Delta_N]$. The underlying assumption is that optimal solutions with respect to the general cost function may lie in the vicinity of an optimal solution with respect to the LS estimates. Conceptualized in a three-dimensional space, the LS estimator 208 may select a solution "point" of the various parameter values (e.g. a coordinate made up of parameter values). The limiter 214 may then select a constrained parameter set $[p_1 \ldots p_N]_G$ by limiting the general cost parameters to an area around that solution point, with the area defined by the delta corresponding to each parameter. The deltas may be programmable values that may be set in the firmware, or adaptively adjusted by the system 200.

As an example, a LS parameter estimate may be the value 10, with a corresponding delta of ±7, to establish a parameter range of 3 to 17. The general cost function 210 may generate a corresponding parameter value of 30. The limiter 214 may adjust the general cost parameter to the nearest value within the parameter range; here, reduced from 30 to 17. Accordingly, the constrained parameter value may be set to 17 and provided to the detector 206 or other channel component. Phrased another way: the value of a constrained parameter $p_{G'}$ may be set to the value of the general cost parameter $p_G$ if $p_G$ falls within the permissible range of the LS parameter $p_i \pm \Delta_i$, or set to the value within the permissible range closest to the general cost parameter value when the general cost parameter value is outside the permissible range.

$$P_{G'} = p_G, \text{ when } p_G \text{ is within } p_i \pm \Delta_i; \text{ or}$$

$$p_i + \Delta_i, \text{ when } p_G > (p_i + \Delta_i); \text{ or}$$

$$p_i - \Delta_i, \text{ when } p_G < (p_i - \Delta_i).$$

In an example embodiment the parameters may be 8-bit quantities or values (e.g. within a range of 0 to 255), and the deltas may be ±3 bits (e.g. within a value of 8 from the estimated LS parameter value). If the delta values were set to 0, then the parameter values would be constrained to exactly match the LS estimates for the parameter values.

Once an initial constrained parameter solution has been selected, the system 100 can continue to adapt in order to track changes in the channel response and noise statistics. Another implementation of a system for performing constrained parameter optimization is discussed in regard to FIG. 3.

Figure 3:
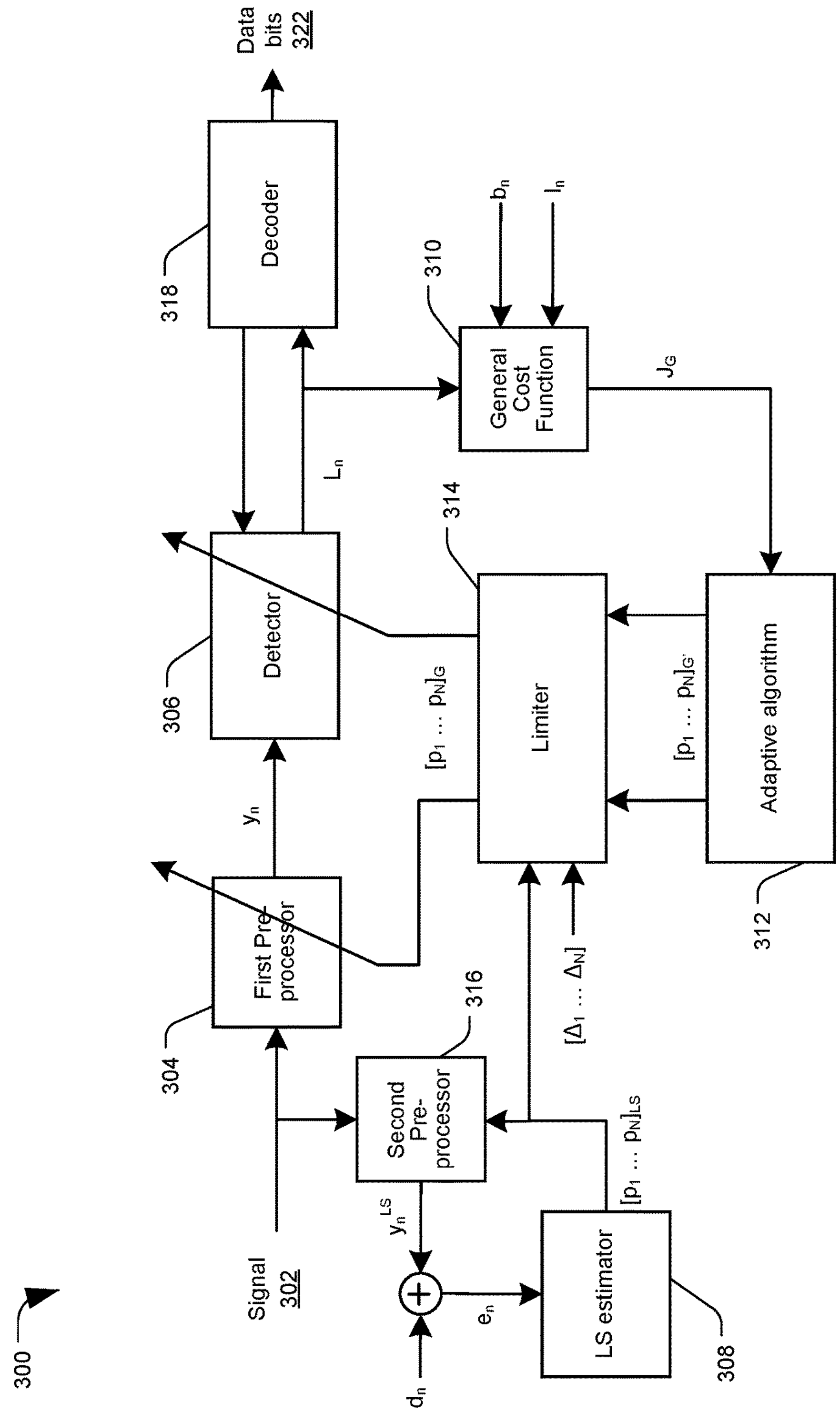
FIG. 3 is a method flow diagram of a system configured to perform constrained receiver parameter optimization, in accordance with certain embodiments of the present disclosure.

FIG. 3 depicts a method flow diagram of a system 300 configured to perform constrained channel parameter optimization, in accordance with certain embodiments of the present disclosure. System 300 may correspond to system 100 of FIG. 1, including elements such as the signal 302, pre-processor 304, detector 306, data bits 322, least squares (LS) estimator or algorithm module 308, and general cost function 310. The system 300 may also have additional depicted components, such as an iterative decoder 318 to iteratively perform ECC decoding on estimated bit values from the detector 306 to attempt to determine a corrected bit sequence 322.

In system 300, some or all of the components of the first pre-processor 304 may be duplicated with a second pre-processor 316. The first and second pre-processors may be achieved via duplicating separate physical components for each pre-processor, or by using a multiplexer to adjust input signals and parameters to achieve two different pre-processor behaviors with a single set of physical pre-processor components. The first pre-processor 304 may search and optimize parameter values with respect to a general cost function. The second pre-processor 316 may be used to run least squares optimization, and provide input to the LS estimator 308. The second pre-processor 316 and the LS estimator 308 may be used to estimate a least squares solution via an adaptive algorithm, and the LS solution can be used to center a search space for the first pre-processor 304 (e.g via limiter 314). In doing so, the first preprocessor (parameter set) can achieve better performance with respect to the figure-of-merit of interest.

For example, the pre-processor parameters to be modified could be equalizer coefficients. The first set of coefficients used in the first pre-processor 304 may minimize BER as measured at the detector 306 output. The second set of equalizer coefficients may minimize mean squared error as measured at the equalizer output of the second pre-processor 316.

The first pre-processor 304 may generate sample values $y_n$ based on a general cost function constrained based on a least squares solution. The first pre-processor 304 may provide the sample values $y_n$ to the detector 306, which may generate detected bit values and reliability information $L_n$, (e.g. SOVA LRRs). The general cost function 310 may generate an output $J_G$ as a function of $(L_n, b_n, I_n)$. The output $J_G$ may be provided to an adaptive algorithm 312, which may generate a general cost parameter set $[p_1 \ldots p_N]_{G'}$, and provide it to a limiter 314.

The second pre-processor 316 may be adaptively adjusted based on LS parameter optimization, to produce a set of samples $y_n^{LS}$ The system 300 may know what the "ideal" sample values $d_n$ would be, and those values may be subtracted from the observed values $y_n^{LS}$ to obtain error values $e_n$. The error values $e_n$ may be provided to the LS estimator 308. In some embodiments, expected data bits $b_n$ could be provided to the LS estimator 308 instead of $d_n$ or $e_n$.

Similar to $b_n$, the ideal or desired values $d_n$ may be learned through training (e.g. reading or receiving a known value and comparing against the observed values), or learned after error correction is performed on the signal 302. For learning after error correction, an error-corrected bit sequence can be reversed into ideal sample values. Given the target response of the equalizer and a sequence of corrected data bits, the ideal sample values can be computed. For training mode, the sequence of data bits may be known beforehand, e.g. typically implemented via a pseudo-random binary sequence (PRBS) generator. For a decoder-directed adaptation mode, the LS updates may be delayed until the decoded bits are available, at which time the updates can be computed and applied.

The LS adaptive algorithm may use the error values $e_n$ to generate a LS parameter set $[p_1 \ldots p_N]_{LS}$. The LS parameter set may be provided to the second pre-processor 316 in order to adjust the pre-processor parameters, which may improve the sample values $y_n^{LS}$. In this manner the LS estimator 308 may adaptively improve the sample values generated by the second pre-processor 316.

The LS parameter set, along with a parameter constraint range $[\Delta_1 \ldots \Delta_N]$, may also be provided to the limiter 314, which may constrain the general cost parameter set $[p_1 \ldots p_N]_{G'}$ in order to generate the constrained parameter set $[p_1 \ldots p_N]_G$ used in the main data-path of the channel, including the first pre-processor 304. For example, if a parameter value from the general cost parameter set exceeds the range set by a LS parameter $p_i \pm \Delta_i$, the limiter may generate a constrained parameter that is the closest value to the general cost parameter still within the set range of the LS parameter. The constrained parameter set may be provided to the detector 306, the first pre-processor 304, or other components of the system 300 in order to adjust parameter settings and behavior of those components. For example, an equalizer of the first pre-processor 304 may be neural network based, and the measured BER may be used to generate a set of constrained parameters to prune hidden or non-helpful nodes in the neural network.

Figure 5:
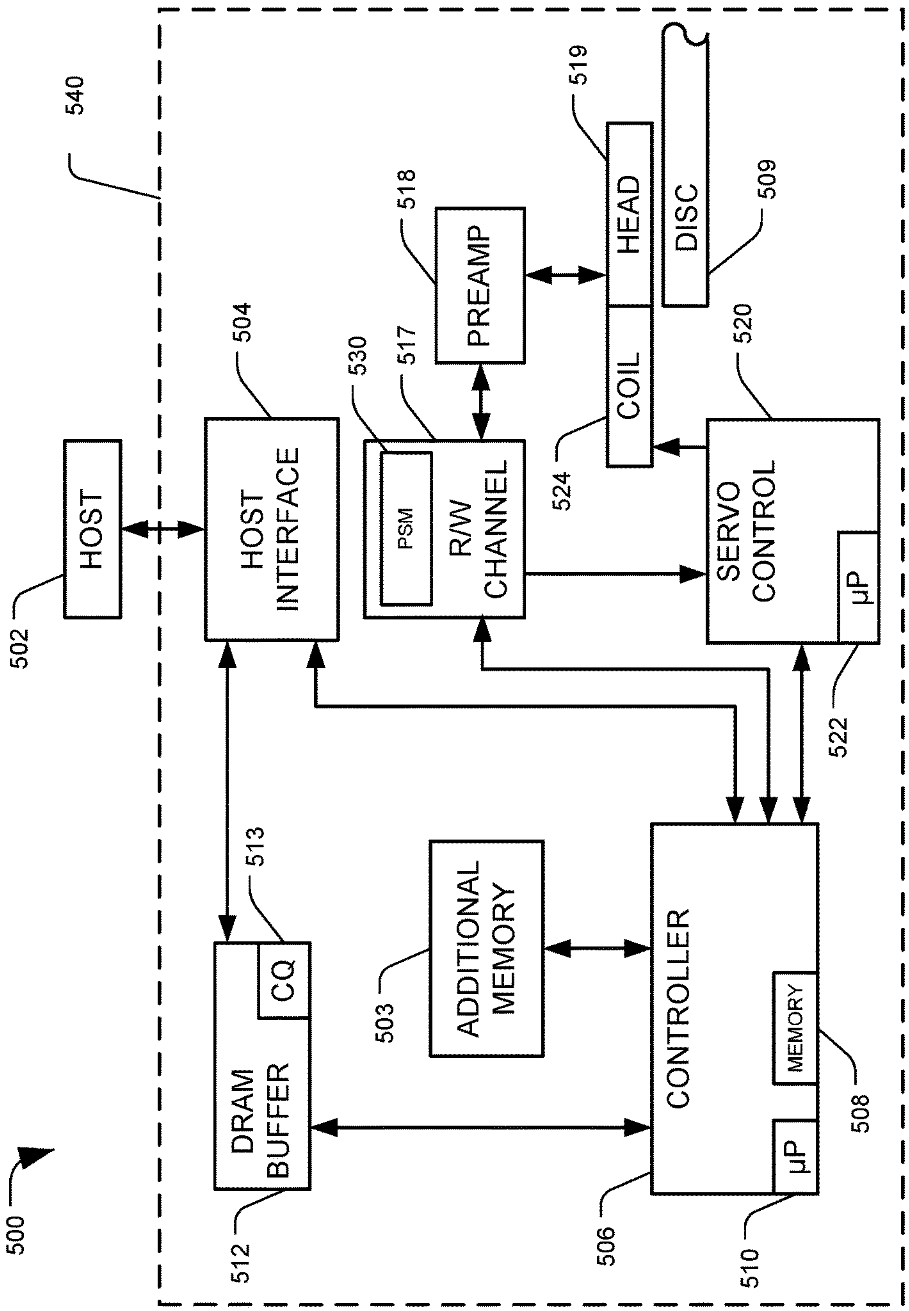
FIG. 5 is a diagram of a system configured to perform constrained receiver parameter optimization, in accordance with certain embodiments of the present disclosure.

The LS estimator 308 may apply different update equations for the first pre-processor 304 (e.g. for equalizer coefficients) and for detector 306 parameters. Similarly, the limiter 314 may apply different constrained parameter sets for each component or parameter set to be modified. Accordingly, the LS parameter set $[p_1 \ldots p_N]_{LS}$, the parameter constraint range $[\Delta_1 \ldots \Delta_N]$, and the constrained parameter set $[p_1 \ldots p_N]_G$ may include multiple sets of data for the different parameters to be limited, or separate sets may be provided for each set of parameters to be limited. In contrast, the LS estimator 208 of FIG. 2 may only calculate values to modify the detector 206, according to certain embodiments. A device configured to per perform constrained channel parameter optimization as described herein is shown in FIG. 5.

Figure 4:
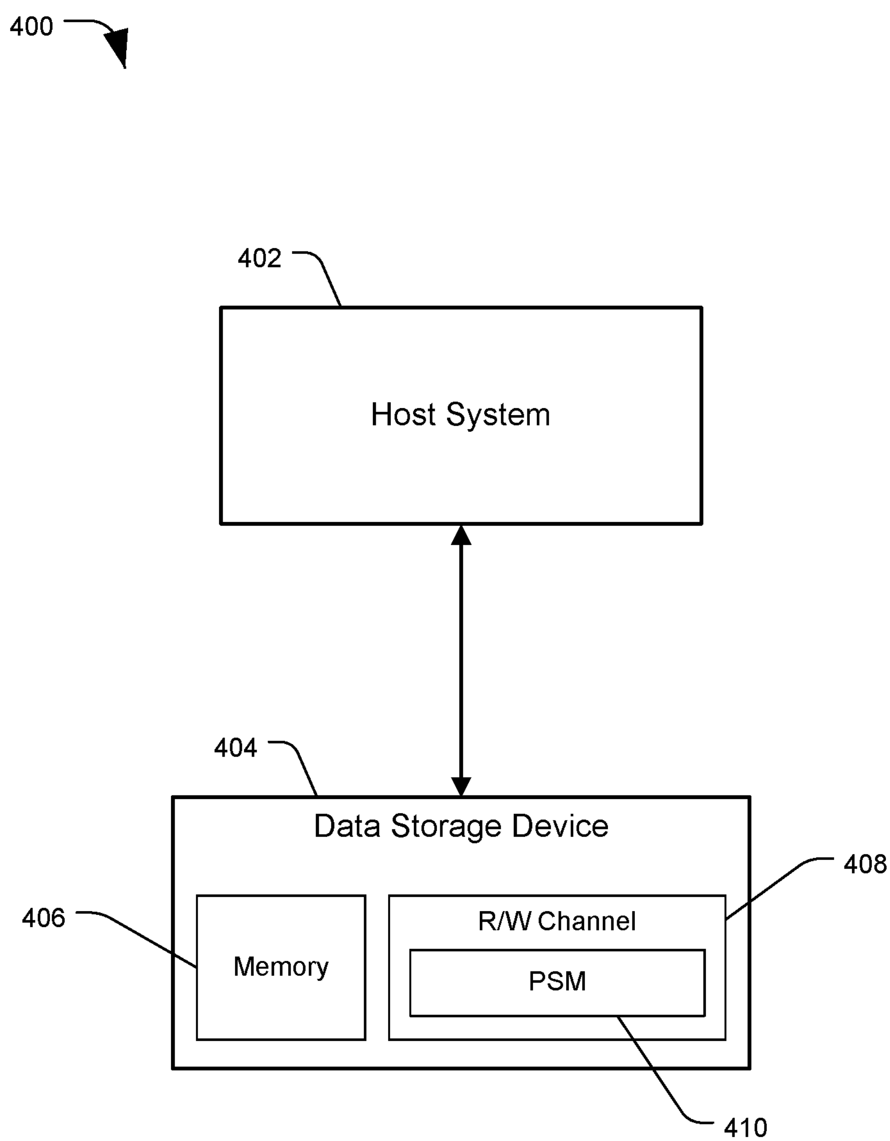
FIG. 4 is a diagram of a system configured to perform constrained receiver parameter optimization, in accordance with certain embodiments of the present disclosure.

FIG. 4 is a diagram of a system, generally designated 400, configured to perform constrained receiver parameter optimization, in accordance with certain embodiments of the present disclosure. The system 400 may include a host 402 and a data storage device (DSD) 404. The host 402 may also be referred to as the host system or host computer. The host 402 can be a desktop computer, a laptop computer, a server, a tablet computer, a telephone, a music player, another electronic device, or any combination thereof. Similarly, the DSD 404 may be any of the above-listed devices, or any other device which may be used to store or retrieve data, such as a hard disc drive (HDD). The host 402 and DSD 404 may be connected by way of a wired or wireless connection, or by a local area network (LAN) or wide area network (WAN). In some embodiments, the DSD 404 can be a stand-alone device not connected to a host 402 (e.g. a removable data storage device having its own case or housing), or the host 402 and DSD 404 may both be part of a single unit (e.g. a computer having an internal hard drive).

The DSD 404 may include a memory 406 and a read/write (R/W) channel 408, such as the receiver described in regard to FIG. 1. The memory 406 may comprise one or more data storage mediums, such as magnetic storage media like disc drives, other types of memory, or a combination thereof. The DSD 404 may receive a data access request, such as a read or write request, from the host device 402. In response, the DSD 404 may perform data access operations on the memory 406 via the R/W channel 408 based on the request. The R/W channel 408 may comprise one or more circuits or processors configured to process signals for recording to or reading from the memory 406.

DSD 404 may include a parameter selection module (PSM) 410. The PSM 510 may perform the methods and processes described herein to constrain a first parameter set generated using a first process by a second parameter set generated using a second process, and to apply the constrained parameter set for signal processing in a data channel. FIG. 5 provides a more detailed depiction of the system 400, according to certain embodiments.

FIG. 5 is a diagram of a system, generally designated 500, configured to perform constrained channel parameter optimization, in accordance with certain embodiments of the present disclosure. Specifically, FIG. 5 provides a functional block diagram of an example data storage device (DSD) 500. The DSD 500 can communicate with a host device 502 (such as the host system 402 shown in FIG. 4) via a hardware or firmware-based interface circuit 504. The interface 504 may comprise any interface that allows communication between a host 502 and a DSD 500, either wired or wireless, such as USB, IEEE 1394, Compact Flash, SATA, eSATA, PATA, SCSI, SAS, PCIe, Fibre Channel, Ethernet, or Thunderbolt, among others. The interface 604 may include a connector (not shown) that allows the DSD 500 to be physically removed from the host 502. The DSD 500 may have a casing 540 housing the components of the DSD 500, or the components of the DSD 500 may be attached to the housing, or a combination thereof. The DSD 500 may communicate with the host 502 through the interface 504 over wired or wireless communication.

The buffer 512 can temporarily store data during read and write operations, and can include a command queue (CQ) 513 where multiple pending operations can be temporarily stored pending execution. Commands arriving over the interface 504 may automatically be received in the CQ 513 or may be stored there by controller 506, interface 504, or another component.

The DSD 500 can include a programmable controller 506, which can include associated memory 508 and processor 510. The controller 506 may control data access operations, such as reads and writes, to one or more memories, such as disc memory 509. The DSD 500 may include an additional memory 503 instead of or in addition to disc memory 509. For example, additional memory 503 can be a solid state memory, which can be either volatile memory such as DRAM or SRAM, or non-volatile memory, such as NAND Flash memory. The additional memory 503 can function as a cache and store recently or frequently read or written data, or data likely to be read soon. Additional memory 503 may also function as main storage instead of or in addition to disc(s) 509. A DSD 500 containing multiple types of non-volatile storage mediums, such as a disc(s) 509 and Flash 503, may be referred to as a hybrid storage device.

The DSD 500 can include a read-write (R/W) channel 517, which can encode data during write operations and reconstruct user data retrieved from a memory, such as disc(s) 509, during read operations. A preamplifier circuit (preamp) 518 can apply write currents to the head(s) 519 and provides pre-amplification of read-back signals. In some embodiments, the preamp 518 and head(s) 519 may be considered part of the R/W channel 517. A servo control circuit 520 may use servo data to provide the appropriate current to the coil 524, sometimes called a voice coil motor (VCM), to position the head(s) 519 over a desired area of the disc(s) 509. The controller 506 can communicate with a processor 522 to move the head(s) 519 to the desired locations on the disc(s) 509 during execution of various pending commands in the command queue 513.

DSD 500 may include a parameter selection module (PSM) 530. The PSM 530 may perform the methods and processes described herein generate a first parameter set using a first algorithm or process, and a second parameter set using a second algorithm or process. For example, the PSM 530 may generate the first parameter set using a least mean squares function, and generate the second parameter set using a general cost function. The PSM 530 may then constrain the second parameter set based on the first parameter set to determine a constrained parameter set, and use the constrained parameter set to establish settings used in the R/W channel 517. The PSM 530 may be a processor, controller, other circuit, or a portion thereof. The PSM 530 may include a set of software instructions that, when executed by a processing device, perform the functions of the PSM 530. The PSM 530 may be part of or executed by R/W channel 517, included in or performed by other components of the DSD 500, a stand-alone component, or any combination thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. For example, the adaptive algorithm 212 and the general cost function 210 of FIG. 2 may be combined into a single functional component. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A circuit comprising:

a digital receiver including:

a pre-processor module configured to sample a signal to generate sample values;

a least squares function circuit configured to determine a first parameter set for the digital receiver based on the sample values and a least squares algorithm;

a general cost function circuit configured to determine a second parameter set for the digital receiver based on a general cost algorithm;

a limiter module configured to:

constrain results of the second parameter set to fall within a selected value range of the first parameter set in order to generate a third parameter set;

modify applied parameters of the digital receiver based on the third parameter set; and a detector configured to generate one or more bit values from the sample values based on the applied parameters of the digital receiver.

2. The circuit of claim 1 further comprising:

the detector includes a soft output Viterbi algorithm (SOVA) detector configured to generate log likelihood ratio (LLR) values corresponding to the bit values; and the general cost function circuit is configured to determine the second parameter set based on the LLR values.

3. The circuit of claim 1 further comprising:

the limiter module further configured to generate the third parameter set by constraining the second parameter set with the first parameter set and a set of parameter constraint range values that define the selected value range around values of the first parameter set that is permissible for values of the third parameter set.

4. The circuit of claim 3 further comprising:

constraining the second parameter set with the first parameter set and a set of parameter constraint range values includes:

set parameter values of the third parameter set equal to corresponding values from the second parameter set when the corresponding values are within the selective value range; and set parameter values of the third parameter set to values within the numeric range that are nearest to the corresponding values from the second parameter set when the corresponding values are outside the numeric range.

5. The circuit of claim 1 further comprising:

the detector further configured to determine reliability estimates for the bit values;

the least squares function circuit further configured to determine the first parameter set based on the sample values and a least means squared algorithm;

the general cost function circuit further configured to determine the second parameter set based on the reliability estimates; and the limiter module configured to apply the third parameter set to the detector.

6. The circuit of claim 5 further comprising:

the general cost function circuit further configured to determine the second parameter set based on the reliability estimates, expected bit values from the signal, and performance metrics from the digital receiver.

7. The circuit of claim 5 further comprising:

the pre-processor module includes a first pre-processor and a second pre-processor;

the first pre-processor is configured to provide first sample values to the detector;

the second pre-processor is configured to provide second sample values to the least squares function circuit;

the least squares function circuit further configured to:

determine the first parameter set based on an error value derived from the second sample values and ideal sample values;

apply the first parameter set to the second pre-processor to adjust operation of the second pre-processor; and the limiter module further configured to apply the second parameter set to the first pre-processor to adjust operation of the first pre-processor.

8. An apparatus comprising:

a circuit configured to:

select receiver parameters used at a receiver in order to extract data from a signal via signal processing, including:

determine a first parameter set based on a least squares function;

define a limited range of values around the first parameter set; determine a second parameter set based on limiting results of a general cost function to within the limited range of values around the first parameter set;

and perform signal processing on the signal at the receiver using the second parameter set to generate a sequence of bits.

9. The apparatus of claim 8 comprising the circuit further configured to:

determine a third parameter set based on the general cost function; and constrain the third parameter set based on the first parameter set to determine the second parameter set.

10. The apparatus of claim 9 comprising the circuit further configured to:

constrain the third parameter set based on the first parameter set and a set of parameter constraint range values, the parameter constraint range values defining a numeric range around values of the first parameter set within which the values of the second parameter set must fall.

11. The apparatus of claim 10 comprising the circuit further configured to:

constrain the third parameter set based on the first parameter set and a set of parameter constraint range values including:

set parameter values of the second parameter set equal to corresponding values from the third parameter set when the corresponding values are within the numeric range; and set parameter values of the second parameter set to values within the range that are nearest to the corresponding values from the third parameter set when the corresponding values are outside the range.

12. The apparatus of claim 8, the circuit comprising the receiver, including:

a least squares function circuit configured to determine the first parameter set;

a general cost function circuit configured to determine a third parameter set for the receiver based on the general cost function; and a limiter module configured to generate the second parameter set by constraining the third parameter set with the first parameter set and a set of parameter constraint range values.

13. The apparatus of claim 12, comprising the receiver further including:

a pre-processor module configured to sample a signal to generate sample values;

a detector module configured to determine bit values based on the sample values, and reliability estimates for the bit values;

the least squares function circuit further configured to determine the first parameter set based on the sample values and a least means squared algorithm;

the general cost function circuit further configured to determine the third parameter set based on the reliability estimates; and the limiter module configured to apply the second parameter set to the detector module.

14. The apparatus of claim 13, further comprising:

the pre-processor module includes a first pre-processor and a second pre-processor;

the first pre-processor is configured to provide first sample values to the detector;

the second pre-processor is configured to provide second sample values to the least squares function module;

the least squares function circuit is further configured to:

determine the first parameter set based on an error value derived from the second sample values and ideal sample values;

apply the first parameter set to the second pre-processor to adjust operation of the second pre-processor; and the limiter module further configured to apply the second parameter set to the first pre-processor to adjust operation of the first pre-processor.

15. The apparatus of claim 13, further comprising:

the general cost function circuit further configured to determine the third parameter set based on the reliability estimates, expected bit values from the signal, and performance metrics from the receiver.

16. The apparatus of claim 15, further comprising:

a general cost function circuit includes an adaptive algorithm configured to change behavior based on measurements of the general cost function.

17. A method comprising:

performing a parameter optimization procedure to select receiver parameters for a receiver in order to extract data from a signal via signal processing, including:

determining, at a circuit of the receiver, a first parameter set based on a first function;

defining, at the circuit, a limited range of values around the first parameter set; determining, at the circuit, a second parameter set based on limiting results of a second function different from the first function to within the limited range of values around the first parameter set;

and performing signal processing in the receiver to generate data bits from the signal using the second parameter set.

18. The method of claim 17 further comprising:

the first function includes a least squares function;

the second function includes a general cost function; and limited range of values defining a numeric range around values of the first parameter that is permissible for values of the second parameter set, and wherein values outside the limited range of values are excluded as possibilities for the second parameter set.

19. The method of claim 18 further comprising:

providing first sample values obtained from a signal by a first pre-processor to a least squares function circuit configured to perform the least squares function;

providing second sample values obtained from the signal by a second pre-processor to a detector;

determining, via the least squares function circuit, the first parameter set based on an error value derived from the first sample values and ideal sample values;

applying, via the least squares function circuit, the first parameter set to the first pre-processor to adjust operation of the first pre-processor; and applying the second parameter set to the second pre-processor to adjust operation of the second pre-processor.

20. The method of claim 17 further comprising:

determining the first parameter set based on sample values obtained from a signal;

determining the second parameter set based on the output of a Viterbi detector; and determining the second parameter set via an adaptive algorithm configured to change behavior based on measurements of the second function.

* * * * *